United States Patent
Quante et al.

[15] 3,636,240
[45] Jan. 18, 1972

[54] CABLE SPLICE PROTECTOR

[72] Inventors: Hermann Quante; Peter Neumann, both of Wuppertal; Walter Rose, Dahl, all of Germany

[73] Assignees: Firma Wilhelm Quante, Wuppertal-Elberfeld; Firma Walter Rose KG, Hagen, Germany

[22] Filed: Nov. 10, 1970

[21] Appl. No.: 88,330

[30] Foreign Application Priority Data

Apr. 23, 1970 Germany .....................P 20 19 543.1
Nov. 11, 1969 Germany .....................P 19 56 570.9

[52] U.S. Cl. .............................174/92, 174/21 R, 174/77 R, 174/88
[51] Int. Cl. ......................................................H02g 15/08
[58] Field of Search..................................174/91–93, 88 R, 174/77 R, 21 R, 22 R

[56] References Cited

UNITED STATES PATENTS

| 3,236,934 | 2/1966 | Revelle et al. | 174/22 R |
| 3,271,505 | 9/1966 | Dellett et al. | 174/92 X |
| 3,466,384 | 9/1969 | Martin | 174/92 |

*Primary Examiner*—Darrell L. Clay
*Attorney*—Michael S. Striker

[57] ABSTRACT

A sleeve for protecting a cable splice is composed of at least two elongated shell sections having abutting sealing faces and being composed of synthetic plastic material. Longitudinal grooves are provided in the sealing faces and permanently plastomeric sealing material is accommodated in these grooves. Moisture barrier means is embedded in the shell sections in form of a foil, preferably a compound foil of metal to which thermoplastic material is adhered.

23 Claims, 13 Drawing Figures

INVENTORS
HERMANN QUANTE
PETER NEUMANN
WALTER ROSE

By: *[signature]*
Attorney

INVENTORS
HERMANN QUANTZ
PETER NEUMANN
WALTER ROSE

CABLE SPLICE PROTECTOR

BACKGROUND OF THE INVENTION

The present invention relates generally to cable splice protectors, and more particularly to cable splice protectors composed of two or more shell sections.

Where cables are spliced, regardless of what type of cable is involved, it is necessary to protect the splice against deleterious influences, not only of a mechanical nature but also in so far as the intrusion of moisture is concerned. Of course, there are many different types of cables for many different purposes, and these accordingly are made with many different types of insulators and jackets for the conductors. Also, the different locations where a splice is to be located—that is buried in the ground, exposed in the air, located in a junction box, etc.—dictate the use of various different types of cable splice protectors. It is frequently necessary in practice to use two different types of protectors one of which surrounds the other in order to obtain with one the requisite mechanical protection and with the other the necessary protection against the intrusion of moisture.

For instance it is known to use—where metallic-jacketed cable with paper-insulated conductors is used—to employ one-piece longitudinally slotted lead sleeves which accommodate the cable splice in their interior and which are soldered to the metallic jacket of the cable at their opposite ends as well as along their longitudinal slot. This is a protection against the intrusion of moisture. However, the mechanical protection afforded by this construction is very inadequate and therefore, if for instance the thus-protected splice is to be buried in the ground, an additional cable splice protector usually consisting of cast iron is placed about the lead sleeve to provide the requisite mechanical protection. The cast iron protector is composed of longitudinal shell sections which are so sealed when they are placed into abutment, by means of hemp cords, that the space between the inner surface of the cast iron protector and the outer surface of the lead sleeve can be filled with a compound—usually on a bituminous basis—which is poured in through an opening that is subsequently closed. With this construction mechanical damaging of the lead sleeve by external forces is avoided, as is mechanical damage due to entering moisture which subsequently freezes. The hemp sealing ropes prevent the bituminous mass—which is heated to approximately 150° and has low viscosity at this temperature—from running out until such time as it has cooled down and again becomes highly viscous where this running-out danger no longer exists.

However, it has been found that the rather good protection afforded a splice with this construction, is exceedingly expensive in terms of the materials required and the necessary installation. If, on the other hand, one omits the lead sleeve and uses only the cast-iron protector, the protection afforded against the intrusion of moisture to the cable splice becomes inadequate. The reason for this is that the hemp sealing cords extend only along the longitudinal sides of the sleeve and the rather large inlet and outlet openings for the cable—which must be large because it must be capable of accommodating differently dimensioned cables—can be filled and closed only with a winding of textile, paper or the like which is impregnated with sealing compound. This is inadequate.

If cable splices are to be protected on cables having plastic jackets, rather than metallic jackets, other splice protectors are known and used. It is for instance to use windings of synthetic plastic tapes or nonvulcanized rubber tapes, protective sleeves of thermoplastic materials, sleeves using hardenable resins and the like. These various possibilities can and are frequently also combined in various ways. Their primary consideration is to provide protection against the intrusion of moisture. The use of additional cast-iron outer protective sleeves can provide additional mechanical protection. However, in plastic-jacketed cables it is frequently found that any subsequent access to the splice for the addition of further cable portions thereto, or for the correction of errors, requires destruction of the protector which must subsequently be replaced, thus providing for a significant expense in terms of materials and labor required.

SUMMARY OF THE INVENTION

It is, accordingly, an object of the present invention to overcome the aforementioned disadvantages.

More particularly, it is an object of the present invention to provide an improved cable splice protector which is not possessed of the aforementioned drawbacks.

A concomitant object of the invention is to provide such an improved cable splice protector which can equally well be used for metal-jacketed and plastic-jacketed cables.

In pursuance of the above objects, and others which will become apparent hereafter, one feature of the invention resides in a cable splice protector which, briefly stated, comprises a sleeve composed of at least two elongated shell sections having abutting sealing faces and being composed of synthetic plastic material. Longitudinal grooves are provided in these sealing faces and permanently plastomeric sealing material is accommodated in these grooves for sealing the juncture of the shell sections. Moisture barrier means is embedded in the shell sections.

Resort to the present invention greatly simplifies the construction of the protector and also its application to the splice. The shell sections may consist of duroplastic synthetic plastic material the surfaces of which may be further protected, if desired, by a protective metallic layer of powder, applied by galvanizing or sintering or in any other suitable manner. The term plastomeric as used herein is intended to indicate that the sealing material remains in plastically deformable state, wherein "duroplastic" designates durable plastics.

According to the present invention any sleeves or components requiring welding, casting of resins, and the use of lead are omitted. The water or moisture barrier according to the present invention may be in form of a metallic foil combined with a foil of thermoplastic material which forms a layer construction with the metallic layer.

The protector has an inlet and an outlet for the cable and two annular sealing elements in the region of the respective inlet and outlet are provided with centering openings accommodated to the respective outer cable diameter and determine in conjunction with recesses or grooves provided in the inner surfaces of the shell sections and in which grooves they are in part accommodated, the width and thickness of the sealing material packing which is to be used in addition at the inlet and outlet. The same material which is accommodated in the grooves and is of permanently plastomeric characteristics, is also wound about the cable in form of tapes or ribbons in the region of the inlet and outlet to guarantee a watertight and pressuretight sealing of the interior of the protector. Air inclusions which may occur as the material is wrapped about the cables are squeezed out as the two shell sections are united to close the protector. Because the sealing material is permanently plastomeric, that is remains in plastically deformable state, its sealing efficiency is retained over long periods of time and also the protector can be opened at any time for access to the splice, and can be reclosed, without damaging the sealing material.

A strain relief is provided for the cable at the respective inlet and outlet and exerts requisite pressure upon the cable when the protector is closed.

Sealing and strain relief can be used for all commonly employed types of metallic and plastically jacketed cables. If the cables are further provided with an additional outer protection in addition to the jacket, such as wires or metallic strips wound about the exterior of the jacket, then further provision may be made in the protector according to the present invention to connect this additional outer armoring with the protector without having to bend or kink the armoring.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENTS

It is pointed out that in all embodiments the protector according to the present invention is a sleeve composed of two shell sections 1 and 1' which are connected with one another by means of screw connections 2 utilizing embedded nuts embedded in the material of the shell sections 1 and 1' and bolts or threaded rods connecting these nuts. The sealing faces 3, 3' of the shell sections 1, 1' are provided with nonillustrated longitudinally extending grooves which accommodate ropes (also not shown) of permanently plastomeric sealing material, a variety of such materials being known to those skilled in the art.

In the region of the openings through which the cable passes into and out of the protector, these ropes terminate at and sealingly engage seals 4. The width of seals 4 is determined by elements 5, 5' which are partially received in grooves 20, 20' and which are of annular configuration so that through their central apertures the correspondingly dimensioned cable 6 can enter into or leave the protector. A supporting ring 7 is provided and accommodated between the longitudinally slotted cable jacket and the cable core so that the jacket is pressed against the inner wall 8 of the shell sections 1, 1' when the same are united to form a single protective sleeve. The winding 9 surrounds the jacket axially adjacent the supporting ring 7 to prevent the slotting of the jacket from continuing, that is to prevent the jacket from tearing beyond the region where the slotting is necessary.

A wire or similar winding 10 connects the sheath 11 with the cable and terminal tapering portions 12 at the opposite ends of the housing sections or shell sections 1, 1' lead the sheath 11 into a plane 13 in which it is fixedly connected with the protector via a clip or similar connecting element 14. A groove 15 is provided for facilitating ready use of cutters for shortening the sheath 11 when necessary.

Projections 16 are provided with tapped bores which accommodate grounding bolts 17 or nipples for pressure-measuring devices which are not illustrated. The inner surface of each of the shell sections 1, 1' is provided with a metallic foil 18 which is connected with bolts 17 if such are provided. Markings or indicia 19 provide indications to show how far the jackets must be cut on cables having several jackets.

Particularly in the region of the threaded connections 2 the shell sections 1 and 1' are provided with abutment faces 34. Each of the shell sections 1 and 1' has impressed or embedded into it a foil 21 as a moisture or water-vapor barrier, and the foils 21 extend to the region of the disks 5, 5'. The shell sections 1 and 1' are of synthetic plastic material and may be provided with weather-resistant protective coatings 33, for instance of polyethylene or an epoxy resin.

Figure 2:
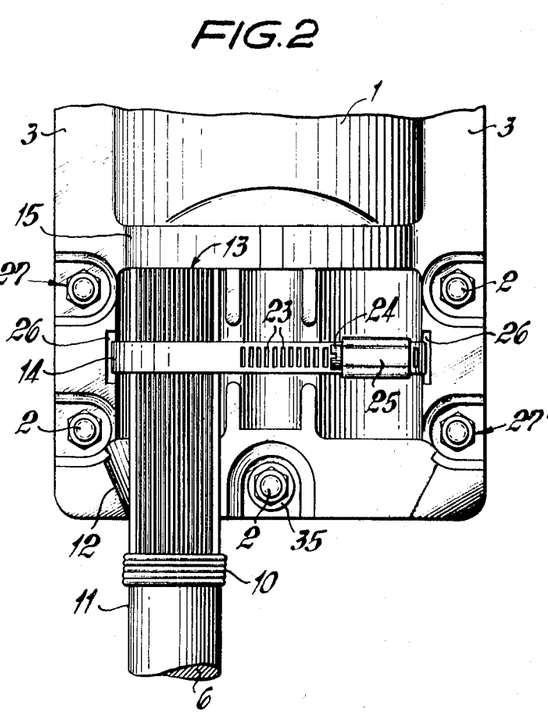
FIG. 2 is an end view of one end of the protector shown in FIG. 1.

In the embodiment of FIG. 2 the sections 1 and 1' are each constructed for two cables 6, but only a single cable is inserted as shown. The sheath 11 extends to the plane 13 via the tapered end portions 12 and the clip 14 engages it and retains it. The clip 14 is provided, as shown, with transverse grooves 23 and a threaded bolt 24 to be longitudinally adjustable. A threaded portion 25 is provided in which the bolt 24 is turned and which is secured at one end of the tape constituting the clip 14 and which one end embraces the other end of the tape with the transverse grooves or depressions. This is customary and such devices are commonly known as hose clamps. Slots 26 are provided in the regions 3, 3' of the shell sections 1, 1' through which the clip 14 is inserted. The threaded connections 2 with their nuts are protected against undesired rotation or turning by means of hexagonal recesses 27 in portions 27' in which the nuts are located. The recesses 27 are covered by washers 35 for the screws or bolts of each connection.

Figure 3:
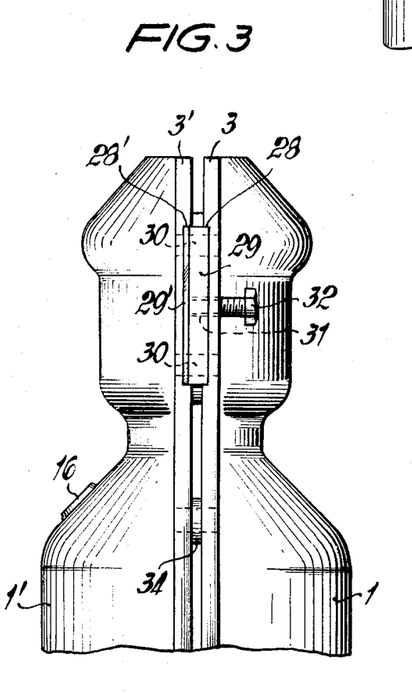
FIG. 3 is a side view of one end of a different embodiment.

The embodiment illustrated in FIG. 3 is provided in the areas 3, 3' with two one-sided recesses or pockets 28, 28' for metal plates 29, 29' which are provided with bores 30 for screw connections 2. The plate 29 will be seen to be thicker than the plate 29' and to have a tapped bore 31 with a screw 32 located between the bores 30. The plate 29' constitutes an abutment for the screw 32 and when the latter is tightened, it presses the shell sections 1, 1' apart in the illustrated manner. The plates 29 and 29' are held against loss by the screw connections 2 which in FIG. 3 have been illustrated as already removed. As illustrated, both shell sections 1 and 1' are engaged by engagement of the plates 29, 29' in the pockets 28, 28'; the protector is opened by separation by at this point also.

Figures 4, 4A:
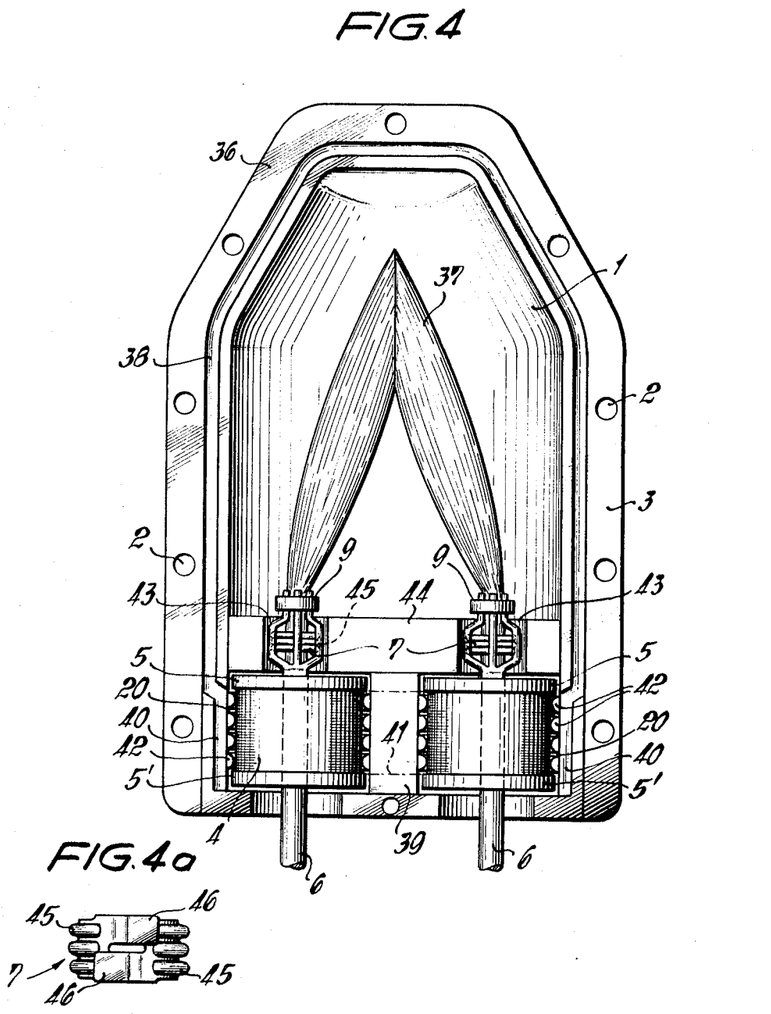
FIG. 4 is a plan view of another embodiment of the invention.
Figure 4B:
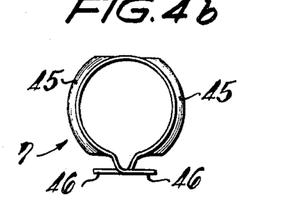

FIG. 4 illustrates a protector according to the present invention for use with a parallel splice, that is a splice in which the cables extend in parallelism with one another rather than in axial alignment. Again, the shell sections are identified with reference numerals 1 and 1' and provided with a trapezoidal section 31 and at the other end with two cables 6 extending in substantial parallelism. The splice is identified with reference numeral 37 and the shell sections 1, 1' are connected by means of screw connections 2 with one another. Permanently plastomeric ropes or sealing materials are accommodated in grooves 38 provided in the areas 3, 3' and extend to sealing elements 4 in the region of the cable entry. Each cable 6 is associated with two of the annular elements 5, 5', with a supporting ring 7, and with a winding 9 as previously discussed.

In the illustrated embodiment the sealing packing 4 is in form of a tape winding the outer layers of which are accommodated by four grooves 20, 20' each which constitute semicircles and are arranged between a middle bead 39 and two longitudinal grooves 40 which constitute the ends of the circumferential groove 38. The grooves 40 are inclined to one another in the region of the grooves 20, 20' and offset in parallelism with and spaced. They communicate with the grooves 20, 20' and the sealing ropes of permanently plastomeric material communicate in sealing relationship with the packings 4 when the shell sections 1, 1' are pressed together to constitute a single sleeve-shaped protector. When this is done the packings 4 enter into the grooves 20, 20' and the plastomeric sealing material ropes are squeezed out of the grooves 40 in part. The packings 4 are connected at their adjacent ends by sealing strips 41 overlying the bead 39 constituted by the opposite ends of the packings 4. The grooves 20, 20' are defined between ribs 42 of semicircular cross section.

Each of the sealing rings 7 is accommodated in a semicircular recess 43 of a transverse bead 44 which in turn may be provided with grooves for ribs 45 on the ring 7. The ribs 45 are formed on the circumference of the ring 7 which latter may preferably consist of nonrusting material and have a springy characteristic. Thus, the ring 7 may be rolled out of a strip of material whose ends overlap one another and which may be half as wide as the strip itself. The diameter of the ring 7 is so chosen that it exerts a pressure upon the cable jacket when the shell sections 1, 1' are connected with one another, and thus acts a pressure-relief for the cable.

Figure 5:
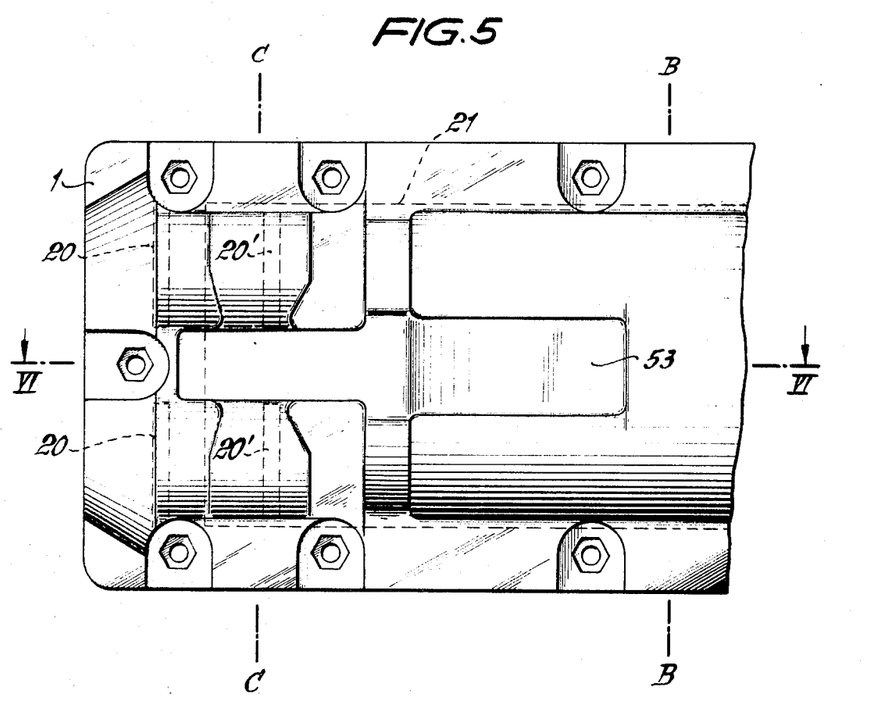
FIG. 5 is a plan view of one end of a shell section.
Figure 6:
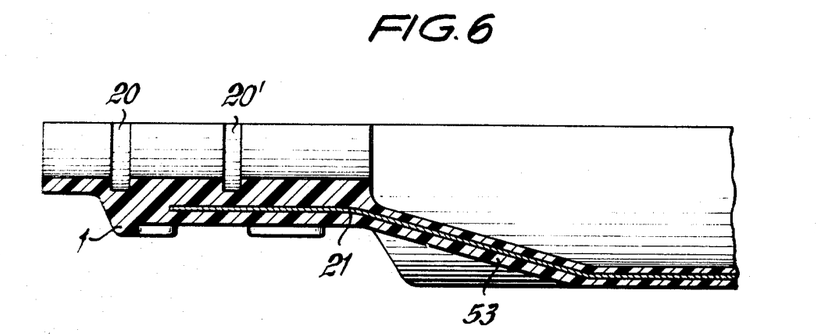
FIG. 6 is a section taken on line A of FIG. 5.

The embodiment in FIGS. 5 and 6 shows that a shell section 1 is semicircular in cross section B—B, whereas the area along line C—C merges into two semicircular contours with lesser radii. A metallic foil 21 is pressed into the material of the shell section 1 and is intended to extend to the not-separately-illustrated sealing regions along the outer edges or sealing faces of the shell section 1, that is those where the grooves for the permanently plastomeric sealing material ropes are provided. The cross-sectional changes over the length of the shell section 1 provide folding contours 53 in the region of the cross-sectional changes and during the pressing of the material of the shell section 1 with the embedded foil 21, the initially planar foil 21 is so deformed that it will not tear at any point or become exposed externally of the material of the shell section 1. The folded contours 53 are arranged where substantial cross-sectional variations of the shell section 1 are necessary.

A metal foil 48 is shown in FIG. 3 as additionally being transversely deformed in corrugated configuration. Beads of different height 50 and 46 facilitate deformation of the foil during the pressing and can either extend over the entire length of the foil or, preferably, be provided only in certain regions where they are most necessary.

Figure 1:
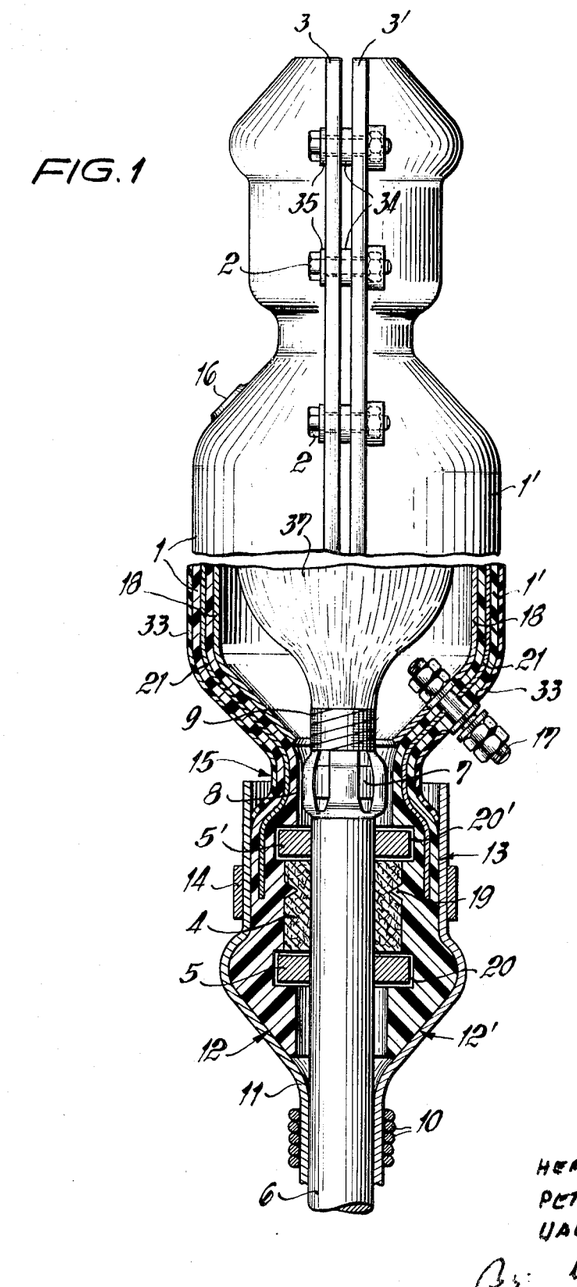
FIG. 1 is a partially sectioned side view of one embodiment of the invention with the cable splice being accommodated in the novel protector.

As shown in FIG. 1, the finished-pressed shell section 1 is to have the metal foil 21 extend everywhere to the regions where the grooves with the embedded permanently plastomeric sealing material ropes are provided, so that in a projection normal to the elongation of the shell section 1, the embedded metal foil 21 will have a rectangular configuration. To obtain this it is necessary, as shown in FIG. 4, to take into account the different cross-sectional configurations of the shell section 1 in the flat metallic blank 47. Of course, the above-mentioned corrugated deformations 50 and 46 may be provided and may be advantageous independently of the configuration of the blank.

The foil may also be in form of a compound foil utilizing a metal layer covered on one or both of its major surfaces with a foil or layer of synthetic thermoplastic material. This facilitates adhesion of the metallic foil with the surrounding duroplastic material of the shell sections. It is pointed out that for manufacturing reasons the metal foil 48 shown in FIG. 1 is provided on both its major surfaces with coatings or layers 49, 49' of thermoplastic material in order to avoid the danger that shifting might occur between the metal foil and loosely applied thermoplastic layers. Such adhesion of the thermoplastic layers to the metal foil can be for instance accomplished by hot stamping of individual foil blanks, or by continuous deposition of the synthetic plastic on the metal foil in an extruder. As shown in FIG. 1 it is possible and in some instances advantageous if the marginal regions 51, 51' of the foil 48 are not covered by the plastic layers or foils 49, 49'. Thus, the foil 49, 49' is coextensive only with the major portion of the foil 48 but not with the circumferential marginal portions 51, 51' thereof. In this manner the danger is avoided that the synthetic plastic material of the foils 49, 49'—which is secured to the foil 48 at elevated temperatures and pressure—might be squeezed to and beyond the edge of the foil 48 and there form uncontrollably large or thick beads.

In the embodiment of FIG. 6 again a shell section is identified with reference numeral 1 which is provided with the areas 55, 55' formed with sealing grooves 52, 52'. Cinches 56, 56' are provided between the semicircular cross section of the section 1 and the adjacent marginal areas and serve, during the pressing of the section 1 to its final configuration, to so deform the metal foil 21 that it becomes exposed at the bottom of the sealing grooves 52, 52'. The purpose of this is to assure that any mass of sealing material which is introduced into the grooves will directly abut against and seal with the metallic moisture barrier.

Figure 8:
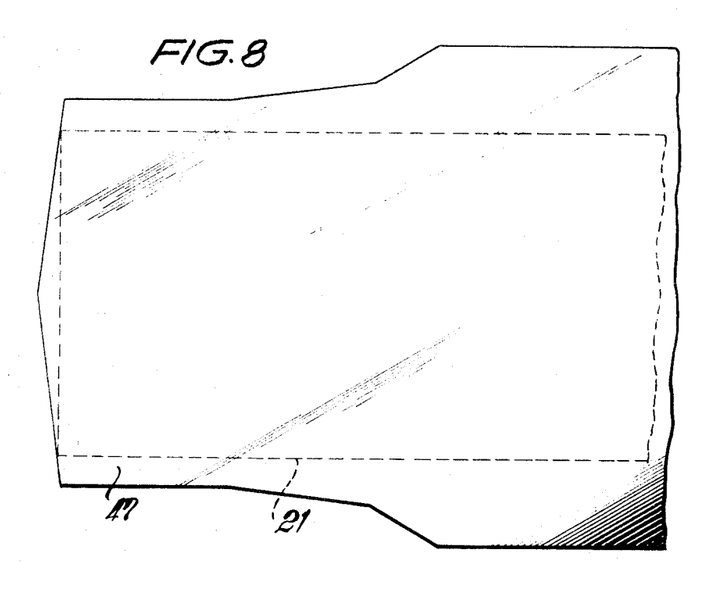
FIG. 8 is a plan view of a metallic foil shaped and used in accordance with the present invention.

In the embodiment of FIG. 8 the shell section 1 is fixed by stamps of a pressing tool 54, 54' at its marginal portions 51, 51' for assuring its precise positioning during forming of the shell section 1, in order to guarantee that the foil will become exposed in the grooves 52, 52' at the bottom thereof as discussed with respect to FIG. 6.

Figure 7:
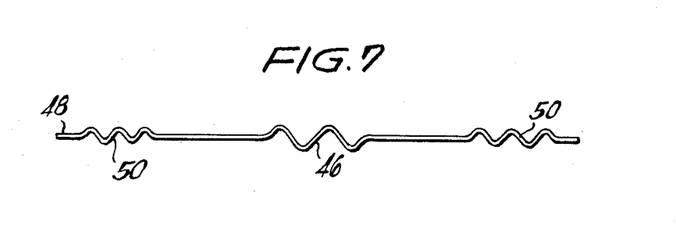
FIG. 7 is a section through a metallic foil used in accordance with the present invention.

The transverse corrugation of the foil 48, as discussed above, is shown in FIG. 7. The projections 50 and 46 are clearly illustrated in this Figure.

The configuration of the blank foil 21 as discussed above, in order for it to have a rectangular cross section in direction normal to the elongation of the shell section 1, is illustrated in FIG. 8 where the necessary changes in the cross-sectional configuration of the blank 1 have already been illustrated and taken into account.

Figure 9:
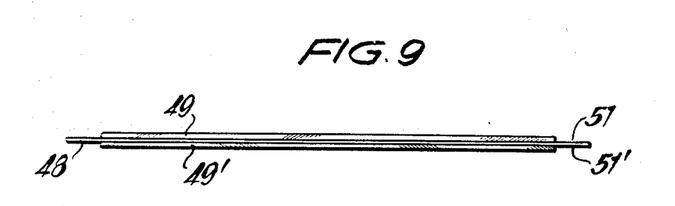
FIG. 9 is a perspective view of a compound foil according to the present invention.

Making the plastic layers 49 and 49' noncoextensive with the metallic foil 48, so that the marginal portions 51 and 51' thereof remain exposed, as illustrated in FIG. 9.

Figure 10:
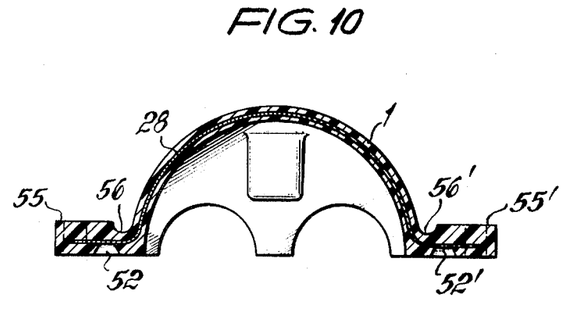
FIG. 10 is a section on line B of FIG. 1.
Figure 11:
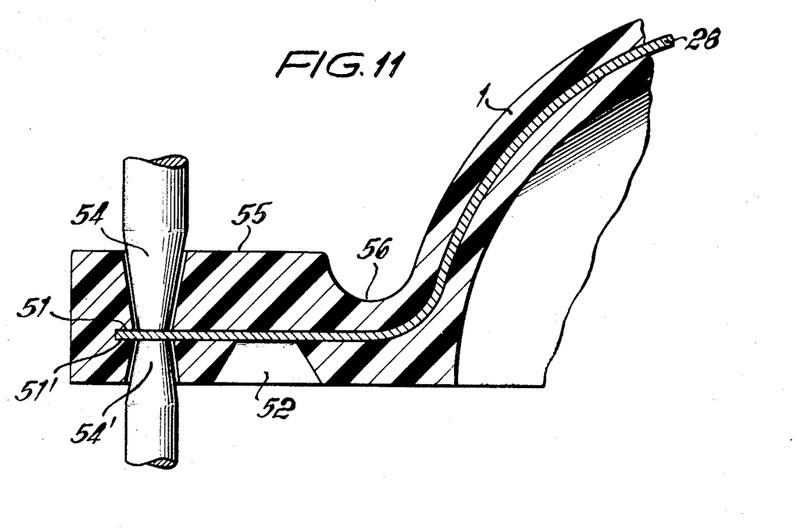
FIG. 11 is an enlarged view illustrating a detail of the shell section in FIG. 10.

The exposure of the foil at the bottom of the grooves 52, 52' due to cinching at 56 and 56' is illustrated in FIG. 10.

Of course, as will be appreciated, the use of grounding bolts or rods as previously indicated can serve to connect the cable jacket with shields, and the like, as well as grounding purposes, which can also be accomplished for grounding the entire protector via copper braid, wire or the like. If metallic cable with additional outer plastic jackets are provided, it is necessary to so cut back the outer jacket in the region of the inlet or outlet to the protector as to prevent an entry of pressure gas between the inner and outer jackets if this is to be avoided and, of course, if the system is to be monitored on the basis of gas pressure fluctuations. The earlier mentioned markings are provided on the protector according to the present invention to indicate how far the cutting-back should be carried out.

The shell sections 1 and 1' may consist of synthetic plastic material, as pointed out before, which preferably is of the type of material known as duroplastic and which may be reinforced with glass fibers. The embedded moisture barrier foil may be prefolded at desired locations prior to its embedding in the material of the shell sections 1, 1' to facilitate and improve its subsequent deformation during the forming of the material of the blanks for the shell sections 1, 1' to their final configuration.

It will be understood that each of the elements described above, or two or more together, may also find a useful application in other types of constructions differing from the types described above.

While the invention has been illustrated and described as embodied in a cable splice protector, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims:

1. A cable splice protector, comprising a sleeve composed of at least two elongated shell sections having abutting sealing faces and composed of synthetic plastic material; longitudinal grooves in said sealing faces; permanently plastomeric sealing material in said grooves for sealing the junctures of said shell sections; and moisture barrier means embedded in said shell sections.

2. A cable splice protector as defined in claim 1, wherein said barrier means comprises at least one first foil of metallic material, and at least one second foil of synthetic plastic material.

3. A cable splice protector as defined in claim 2, wherein said second foil is of thermoplastic material.

4. A cable splice protector as defined in claim 1, wherein said shell sections are made of durable plastic material; and further comprising protective external coatings on said shell sections.

5. A cable splice protector as defined in claim 1; and further comprising protective external coatings on said shell sections.

6. A cable splice protector as defined in claim 5, wherein said protective coatings are coatings of metallic material.

7. A cable splice protector as defined in claim 1, said sleeve having a cable inlet and a cable outlet, and said grooves extending from one to the other of said outlets; and further comprising additional grooves encircling said inlet and outlet, respectively, and connecting said longitudinal grooves.

8. A cable splice protector as defined in claim 7, said additional grooves comprising a plurality of additional grooves surrounding said inlet and outlet in at least substantially parallel grooves spaced axially of said inlet and outlet, respectively; and ribs between respective ones of said additional grooves.

9. A cable splice protector as defined in claim 7; and further comprising annular sealing members accommodated in the respective additional grooves and sealingly surrounding cable in said inlet and outlet.

10. A cable splice protector as defined in claim 7; further comprising cables partly located in said inlet and outlet, respectively, and having an outer cable jacket; and support rings accommodated between said cable and cable jacket and clampingly retained in place by pressure of said shell section upon said jacket.

11. A cable splice protector as defined in claim 7, wherein said inlet and outlet are axially spaced, and wherein said shell sections, and thereby said sleeve, have opposite end portions which converge in direction towards said inlet and said outlet, respectively.

12. A cable splice protector as defined in claim 11, said shell sections also having stepped outer surfaces including inwardly recessed sections provided at said end portions.

13. A cable splice protector as defined in claim 12; and further comprising at least one groove provided in the respective recessed section.

14. A cable splice protector as defined in claim 11; and further comprising cable clamps engaging said cable inwardly of the respective end portions.

15. A cable splice protector as defined in claim 11; and further comprising means engaging said cable outside of but adjacent to the respective end portions in pressure-exerting relationship.

16. A cable splice protector as defined in claim 1; and further comprising threaded nuts nonturnably embedded in said shell sections, and cooperating bolts for engaging the nuts of the respective shell sections and connecting the latter together.

17. A cable splice protector as defined in claim 1, said shell sections having marginal portions in part with pocket-shaped recesses.

18. A cable splice protector as defined in claim 1; and further comprising apertured tapped metallic reinforcing plates accommodated between said sealing faces; and screw means connecting said plates and shell sections.

19. A cable splice protector as defined in claim 1, said sleeve having a cable inlet and a cable outlet, and said moisture barrier means comprising foils embedded in said shell sections and provided in the region of the inlet and outlet of said sleeve with folds.

20. A cable splice protector as defined in claim 1, said barrier means comprising at least one compound foil composed of a metal foil laminated to a synthetic plastic foil.

21. A cable splice protector as defined in claim 20, wherein said plastic foil is a thermoplastic foil.

22. A cable splice protector as defined in claim 21, said metal foil having a main portion and a circumferential marginal portion; and wherein said plastic foil is coextensive only with said main portion.

23. A cable splice protector as defined in claim 22, wherein said compound foil is cinched along lines extending across said main portion.

* * * * *